(12) United States Patent
Takei et al.

(10) Patent No.: US 7,366,366 B2
(45) Date of Patent: Apr. 29, 2008

(54) FBG SENSING SYSTEM

(75) Inventors: Yusuke Takei, Tokyo (JP); Hiromi Ajima, Tokyo (JP); Michitaka Okuta, Tokyo (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 10/572,251

(22) PCT Filed: Sep. 16, 2004

(86) PCT No.: PCT/JP2004/013519

§ 371 (c)(1),
(2), (4) Date: Mar. 17, 2006

(87) PCT Pub. No.: WO2005/028995

PCT Pub. Date: Mar. 31, 2005

(65) Prior Publication Data
US 2007/0053626 A1    Mar. 8, 2007

(30) Foreign Application Priority Data
Sep. 17, 2003 (JP) .............................. 2003-325022

(51) Int. Cl.
G02B 6/00 (2006.01)
(52) U.S. Cl. .......................................... 385/13; 385/37
(58) Field of Classification Search .................. 385/13, 385/37
See application file for complete search history.

(56) References Cited

U.S. PATENT DOCUMENTS 6,276,215 B1 * 8/2001 Berg ........................... 73/800
2001/0013934 A1 * 8/2001 Varnham et al. ............ 356/478
2002/0008518 A1 * 1/2002 Arz et al. .................... 324/322
2002/0117608 A1   8/2002 Ogura (Continued)

FOREIGN PATENT DOCUMENTS

JP    2000-283844    10/2000

(Continued)

OTHER PUBLICATIONS

Akira Mita, "Performance Assessment of Civil Building Structure Using Fiber Optic Sensors", Proceedings of 25th Meeting on Lightwave Sensing Technology, LST 25-16, pp. 111-116, Jun. 2000.

(Continued)

Primary Examiner—Ellen E. Kim
(74) Attorney, Agent, or Firm—Hogan & Hartson LLP

(57) ABSTRACT

To provide a low-cost FBG sensing device having a high reliability, suitable for high-speed measurement such as vibration measurement, able to perform a remote measurement, and simple data processing, the FBG sensing device comprising one or more light sources each outputting a light having fixed output wavelength, one or more fiber-Bragg gratings each having a reflection wavelength band having an attenuation band where the magnitude of reflection attenuates with distance from the center wavelength, the fiber-Bragg gratings reflecting the lights output from said light sources, light receiving units corresponding said fiber-Bragg gratings respectively and receiving the light reflected by the corresponding fiber-Bragg grating, wherein intensities of reflected lights each of which changes corresponding to the attenuation band that changes due to a distortion produced at each of the fiber-Bragg gratings are detected to detect the distortions.

1 Claim, 9 Drawing Sheets

U.S. PATENT DOCUMENTS

| | | |
|---|---|---|
| 2002/0172446 A1* | 11/2002 | Fernald et al. .................. 385/12 |
| 2004/0113055 A1* | 6/2004 | Whelan et al. ......... 250/227.18 |
| 2005/0036527 A1* | 2/2005 | Khazaei et al. ........... 372/29.02 |
| 2005/0140966 A1* | 6/2005 | Yamate et al. .............. 356/73.1 |
| 2006/0008196 A1* | 1/2006 | Bugaud ......................... 385/13 |
| 2006/0070446 A1* | 4/2006 | Tam et al. ..................... 73/705 |
| 2006/0257290 A1* | 11/2006 | Shimizu ..................... 422/100 |
| 2007/0098323 A1* | 5/2007 | Pi et al. ......................... 385/30 |

FOREIGN PATENT DOCUMENTS

| | | |
|---|---|---|
| JP | 2000-329626 | 11/2000 |
| JP | 2001-183114 | 7/2001 |
| JP | 2002-250610 | 9/2002 |
| JP | 2003-021576 | 1/2003 |
| JP | 2003-065730 | 3/2003 |
| JP | 2003-223761 | 8/2003 |
| WO | 98/36252 | 8/1998 |

OTHER PUBLICATIONS

Yamashita, et al., "Application To Optical Measurement/Sensor—recent references of Optronics Optical Communication Technique", Dec. 1995.

* cited by examiner

FBG SENSING SYSTEM

This application is a national phase of PCT application Ser. No. PCT/JP2004/013519 filed Sep. 16, 2004, the entire contents of which are incorporated by reference. This application also claims benefit of priority under 35 U.S.C. § 119 to Japanese Patent Application No. 2003-325022 filed Sep. 17, 2003, the entire contents of which are incorporated by reference.

TECHNICAL FIELD

The present invention relates to an FBG sensing device for performing distortion measurement using an FBG consisting of optical fiber.

BACKGROUND ART

Recently, deterioration of many structures constructed in high growth period, and a research on a method of evaluating the health of the structure is being actively carried out with the government taking the lead. Conventionally, an electrical method using a wire resistance distortion gauge has been the primary method of measuring the distortion of the structure, but had problems of reliability, lightening strike, electromagnetic noise and the like, and thus attention is given to measurement (sensing) by optical fiber that has none of the above problems. It is also noted that the transmission loss of the optical fiber is small so that the remote measurement is possible.

In the optical fiber sensing field, the fiber-Bragg grating (FBG) is used in distortion measurement of the structure in combination with a wide band light source or a wavelength variable light source.

As shown in FIG. 16, the FBG has the refraction index of the core 103c of the optical fiber changed at a regular interval D, and for the light entering the optical fiber, reflects the light of wavelength defined by the interval D and the refraction index of the core 103c and transmits the other wavelengths. Thus, the reflected wavelength is displaced by the change in interval D due to distortion over the FBG 103 or the change in refraction index due to temperature. Normally, the temperature characteristic of the FBG 103 is about 0.01 nm/° C., and the distortion characteristic is about 0.0012 nm/µε. Such characteristics are used in temperature measurement and distortion measurement.

That is, when FBG is applied with stress and expanded or contracted (when FBG is distorted), the grating distance moves and the reflected wavelength of the FBG changes. By attaching the FBG to the measurement sites of the structure, and entering the light of wide band light source or the wavelength variable light source enter therein and measuring the reflected wavelength, the distortion of the FBG, that is, the distortion of the structure can be measured. Further, by measuring at high-speed, the vibration of the structure can be measured and thus is put to practical use as a seismograph.

For instance, as a method of measuring the reflected wavelength of the FBG, a method of using the wide band light source for the light source and using the Fabry-Perot filter (hereinafter referred to as FP) is proposed in patent document 1.

FIG. 9 is a view showing a schematic configuration shown in patent document 1.

The light from a wide band light source 101 is passed through a light branching unit 102 and an optical fiber 108 to an FBG 103. The light of specific wavelength is reflected at the FBG 103, and such reflected light is passed through the optical fiber 108, the light branching unit 102, and an FP filter 104 to a light receiving unit 105. The light that has reached the light receiving unit 105 is converted to a current therein.

An FP filter 104 is an interferometer that uses etalon plates, and drives the distance between the two etalon plates facing parallel to each other by a piezoelectric element to operate the interfering distance. The light passing through the FP filter is a light of specific wavelength defined by the interfering distance. The reflected light of all the wavelength band output from the wide band light source 101 is detected by changing the interfering distance to an arbitrary length. The piezoelectric element is able to set the wavelength with respect to the driving voltage since the driving distance is defined by voltage. By detecting the intensity of light of the light receiving unit 105 corresponding to the driving voltage, the reflectance spectrum from the FBG 103 can be detected and the reflected peak wavelength can be specified.

Moreover, in patent document 2, an FBG sensing device that uses the FP filter as the light source to be the wavelength variable light source is proposed. This device detects the reflectance spectrum from the FBG from the amount of received light corresponding to the driving voltage of the FP filter and specifies the reflected peak wavelength.

The device using such FP filter requires a driving unit for driving the FP filter and thus causes problems in terms of reliability. Further, since the intensity of light of all the wavelengths corresponding to the spectrum of the measuring region must be detected, the number of data becomes a vast amount, and a high-precision arithmetic processing apparatus becomes necessary. The use of such arithmetic processing apparatus becomes the cause of degradation of reliability. Further, the FP filter has wavelength interpolation frequency of about 10 Hz to 100 Hz. According to non-patent document 1, the speed of response of the wavelength measurement is obtained to be 100 to 200 Hz when assuming the vibration measurement during earthquake. Therefore, the device using the FP filter is not suitable for vibration measurement.

In patent document 3, the use of two narrow band filters without the driving unit in the wavelength measurement unit is proposed.

FIG. 10A shows the wavelength measurement unit in the FBG sensing device shown in patent document 3.

It is configured by a wide band light source 201, a 2×2 coupler 202 for branching the light, an FBG 203 that acts as a distortion sensor, a 2×2 coupler 207 for branching the light, a narrow band filter 204 having wavelength dependence, a light receiving unit 205 and an optical fiber 208.

The light output from the wide band light source 201 is transmitted through the optical fiber 208 via the 2×2 coupler 202 and guided to the FBG 203. In FBG 203, the specific wavelength is reflected, which then is passed through the optical fiber 208, returned to the 2×2 coupler 202, branched and guided by the 2×2 coupler 207, and further branched into two parts of A and B, and passed through the narrow band filter 204 and converted to an electrical signal in the light receiving unit 205.

The narrow band filter 204 has wavelength dependence as shown in FIG. 10B, and can detect the reflected wavelength of the FBG 203.

Generally, the SLD (Super Luminescent Diode) light source or ASE (Amplified Spontaneous Emission) light source is used for the wide band light source in these devices.

The ASE light source generates a spontaneous emission light of wide band and high output by entering the excited light of a specific wavelength to the optical fiber added with erbium. An output of about 100 times (improvement of 20 dB) the SLD light source is obtained. The use of light source of higher output allows the measurement sites (FBG) with respect to the light source to be arranged at a more remote location.

As noted above, the transmission loss of the optical fiber is small, but the amount of loss is about 0.25 dB/km. If the output of the light source is improved by 100 times, that is 20 dB, the distance in which the remote measurement is possible can be extended by about 40 km (80 km forward and backward: 80 km×0.25 dB/km=20 dB).

However, the output of the ASE light source which is about −10 dB/nm or so is not a sufficiently large value. In the configuration shown in FIG. 10A, since the narrow band filter 204 has the wavelength dependence as shown in FIG. 10B, the attenuated light is entered to the light receiving unit 205. Generally, the amount of attenuation at the narrow band filter 204 is about 20 dB at maximum (sleeve of the spectrum of FIG. 10B). The minimum light receiving sensitivity of the light receiving unit 205 is about −50 dB, and thus taking the output of the light source and the amount of attenuation of the narrow band filter 204 into consideration, the allowable range of the transmission loss by the optical fiber is only about 20 dB. The allowable range is further reduced when the loss of the other components and the margin of the system are taken into consideration. That is, measurement of a sufficiently remote distance cannot be performed.

When performing the distortion measurement, the temperature characteristic must also be considered in addition to the distortion characteristic, and the amount of displacement of the reflected wavelength caused by distortion change must be subtracted from the amount of displacement of the reflected wavelength caused by temperature change. Thus, when performing the distortion measurement, the FBG having two different reflection wavelength bands must be used.

Non-patent document 2 describes an FBG sensing device, using the wide band light source, for carrying out the FBG having a plurality of different reflection wavelength bands with one optical fiber.

FIG. 17 is a view showing a configuration of the FBG sensing device described in non-patent document 2.

The light from a wide band light source 101 is transmitted through a light branching unit 102, transmitted through an optical fiber 108, and reached to an FBG 103. The light of a plurality of different wavelengths is reflected in the FBG 103, which is then transmitted through the optical fiber 108, transmitted through the light branching unit 102, and reached to a wavelength detector 110, where the reflected wavelength is detected.

Thus, by using the wide band light source 101, the FBG having a plurality of different reflected wavelengths can be arranged in one optical fiber, and a plurality of distortion and temperature amounts can be simultaneously measured.

Generally, the SLD (Super Luminescent Diode) light source or the ASE (Amplified Spontaneous Emission) light source is used for the wide band light source, but the wavelength band thereof is about 30 nm to 50 nm.

The number of FBGs with respect to the band of the wide band light source 101 will now be explained.

Since the temperature characteristic is about 0.01 nm/° C. and the distortion characteristic is about 0.0012 nm/µε, as noted above, the usage band of one FBG 103 requires 0.01 nm×50° C.+0.0012 nm×2000 µε=2.9 nm when measuring the amount of distortion of ±1000µε in the temperature region of for example, 0° C. to 50° C. Further, the reflection wavelength band of the FBG 103 is about 0.2 nm at full width at half maximum, and in consideration thereof, the usage band of one FBG 103 requires about 3.1 nm. Generally, in consideration of the margin, the band of greater than or equal to 4 nm is used for one FBG. Therefore, the number of FBGs 103 of different reflection wavelength band is about ten.

When performing the distortion measurement, two FBGs 103 of for distortion measurement and for temperature compensation are required, as noted above, and the number of distortion measurement becomes five points. The number of points desired for distortion measurement may be less than or equal to ten points, but may be a several dozen points, and thus is not a sufficient number of points.

As a means for increasing the measurement sites, increasing the band of the wide band light source is easily contrived, and a light source having a band of about 100 nm is already commercially available, but is not actively used since the types of FBG 103 increases. Presently, it is generally handled by increasing the number of optical fibers.

Reference is made to patent document 1 (Japanese Laid-Open Patent No. 2003-21576), patent document 2 (Japanese Laid-Open Patent No. 2001-511895), patent document 3 (Japanese Laid-Open Patent No. 2000-223761), non-patent document 1 (Akira Mita, $25^{th}$ Light Wave Sensing Engineering lecture papers, June, 2000 LST 25-16, PP. 111-116), and non-patent patent document 2 (published December, 1995 in Application to Optical Measurement/Sensor, recent references of Optronics Optical Communication Technique by Shinji Yamashita et al.)

DISCLOSURE OF THE INVENTION

Therefore, the prior art has a problem that the driving unit is arranged in the light source or the wavelength measurement unit, so that the reliability thereof is low, and is not suitable for high-speed measurement such as vibration measurement. Further, even with those without a driving unit and suitable for high-speed measurement, disadvantages such as the light source output being insufficient and the remote measurement not being sufficiently performed exist. The wavelength variable light source or the wide band light source having high manufacturing cost is used, and the wavelength detecting unit in which the manufacturing cost is high is used, and thus compared to the electrical method which is the mainline in the structure distortion measurement field, the manufacturing cost is extremely high.

The present invention therefore aims to provide an FBG sensing device that does not include a driving unit in the light source or the wavelength measurement unit and has high reliability, that is suitable for high-speed measurement such as vibration measurement, that has a sufficiently large light source output, that is able to sufficiently perform remote measurement, that has inexpensive manufacturing cost, and that allows a system in which data processing is simplified to be built.

In the above prior art, when performing distortion measurement, the distortion measurement FBG and the temperature compensation FBG must be used as a set, and thus the usage efficiency of the wavelength band is not sufficient.

The present invention, therefore, also aims to provide an FBG sensing device having high wavelength usage efficiency.

In order to achieve the above aim, the first FBG distortion sensing device according to the present invention comprises one or more light sources for outputting a light of fixed output wavelength, one or more fiber-Bragg grating, having a reflection wavelength band including an attenuation band where the magnitude of reflection attenuates away from the center wavelength, for reflecting the light output from the light source, and a light receiving unit, arranged corresponding to each fiber-Bragg grating, for receiving the light reflected at the corresponding fiber-Bragg grating, wherein the distortion is detected by detecting the amount of reflected light that changes corresponding to the attenuation band, which changes due to distortion produced at the fiber-Bragg grating.

The reflection wavelength band is a range where reflection is greater than or equal to a certain level. The reflection wavelength band spreads to both sides of the center frequency at where reflection is the greatest and is defined to be for example, a band where reflection of greater than or equal to −15 dB is obtained, or a band where reflection of greater than or equal to −20 dB is obtained.

In the first FBG distortion sensing device according to the present invention, the output wavelength of the light source is preferably on the short wavelength side from the center wavelength.

Further, in the first FBG distortion sensing device according to the present invention, the output wavelength of the light source is preferably set so that the logarithmic corresponding value of the amount of reflected light is approximately linear to the amount of distortion produced at the fiber-Bragg grating.

In the first FBG distortion sensing device according to the present invention, the relationship of the logarithmic corresponding value of the amount of reflected light from the FBG and the amount of distortion produced at the FBG is preferably linear with respect to the light of arbitrary wavelength in a definite wavelength band including the output wavelength.

Further, in the first FBG distortion sensing device according to the present invention, the output wavelength of the light source is preferably set so that the relationship between the amount of reflected light and the fiber-Bragg grating is linear.

In the FBG distortion sensing device, the amount of reflected light from the FBG is preferably approximately linear to the amount of distortion produced at the FBG for the light of arbitrary wavelength in a definite wavelength region including the output wavelength.

The first FBG distortion sensing device according to the present invention includes a light branching unit for branching the output light of the light source into a plurality of parts, and the fiber-Bragg grating may be connected to the output port of the light branching unit.

Further, the first FBG distortion sensing device according to the present invention includes fiber-Bragg gratings of the same number as the number of the light sources, the each light source outputting the light of different wavelength with respect to each other, and the each fiber-Bragg grating reflecting one light of different wavelength output from the light source.

The first FBG distortion sensing device further includes a optical multi/demultiplexer including a plurality of first input/output terminals and second input/output terminal, the light source being connected to the respective first input/output terminal and the fiber-Bragg grating being connected in series to the second input/output terminal.

The first FBG distortion sensing device further includes a first optical multi/demultiplexer and a second optical multi/demultiplexer each including a plurality of first input/output terminals and a second input/output terminal, the light sources being connected to the respective first input/output terminal of the first optical multi/demultiplexer, the fiber-Bragg gratings being connected to the respective first input/output terminal of the second optical multi/demultiplexer, and the second input/output terminal of the first optical multi/demultiplexer being connected to the second input/output terminal of the second optical multi/demultiplexer.

In the first FBG distortion sensing device, at least one fiber-Bragg grating is arranged in an environment not influenced by distortion and temperature as a reference fiber-Bragg grating, and the amount of change in the intensity of reflected light of the other fiber-Bragg grating is detected with the intensity of reflected light of the reference fiber-Bragg grating as the reference.

In the first FBG distortion sensing device, a light source output control means for controlling the output of the light source is further arranged, at least one of the fiber-Bragg grating is arranged in an environment not influenced by distortion and temperature as a reference fiber-Bragg grating, and the light source output control means generates a control signal for controlling the output of the light source corresponding to the reference fiber-Bragg grating so that the amount of reflected light by the reference fiber-Bragg grating becomes constant and controls all of a plurality of light sources based on the control signal.

Further, in the first FBG sensing device, the light source is preferably an incoherent light source.

A second FBG distortion sensing device according to the present invention comprises a pair of fiber-Bragg gratings in which the reflection wavelength band of the incident light is changed by being subjected to temperature change or distortion and a light source, wherein one of a pair of fiber-Bragg gratings is arranged so as to be simultaneously subjected to the temperature change and distortion, and the other is arranged so as to be subjected to only the temperature change, and the amount of distortion produced at one of the fiber-Bragg grating is detected based on the band width of the synthetic reflectance spectrum in which the reflected waves from the pair of fiber-Bragg gratings are synthesized.

Further, in the above second FBG distortion sensing device according to the present invention, the reflection wavelength bands of the pair of fiber-Bragg gratings at a state without distortion preferably substantially match.

Thus, the FBG sensing device of high wavelength usage efficiency is provided by using the distortion measurement FBG and the temperature compensation FBG at the same wavelength band.

The first FBG sensing device according to the present invention detects the distortion by detecting the amount of reflected light that changes in accordance with the attenuating range changed by distortion produced at the fiber-Bragg grating using the light of fixed output wavelength output from the light source. Therefore, a driving unit does not need to be arranged in the light source or the wavelength measuring unit and the reliability is high. In addition, it is suitable for high-speed measurement such as vibration measurement thereby allowing remote measurement. Further, according to the present invention, the FBG sensing device in which the manufacturing cost is inexpensive, and building a system in which data processing is simple is provided.

In the second FBG sensing device according to the present invention, since one of a pair of fiber-Bragg gratings is arranged so as to be simultaneously subjected to temperature change and distortion and the other is arranged so as to be subjected to only the temperature change, and the amount of distortion caused at one of the fiber-Bragg gratings is detected based on the band width of the synthetic reflectance spectrum in which the reflected waves from the pair of fiber-Bragg gratings are synthesized, only distortion can be measured without being influenced by temperature change.

REFERENCE NUMBER 1, 11, 21a, 21b, 31a, 31b, 41a, 41b light source,
2, 12, 15, 22, 32 light branching unit,
3, 13, 23a, 23b, 33a, 33b, 43a, 43b, 53a, 53b FBG,
4, 14, 24a, 24b, 34a, 34b, 44a, 44b, 54a, 54b light receiving unit,
8, 18, 28, 38, 48, 58 optical fiber,
26, 36, 37, 46 optical multi/demultiplexer,
49 light source output control circuit,
51 wide band light source.

BEST MODE FOR CARRYING OUT THE INVENTION

First Embodiment

The FBG sensing device of a first embodiment according to the present invention will be described.

Figure 1:
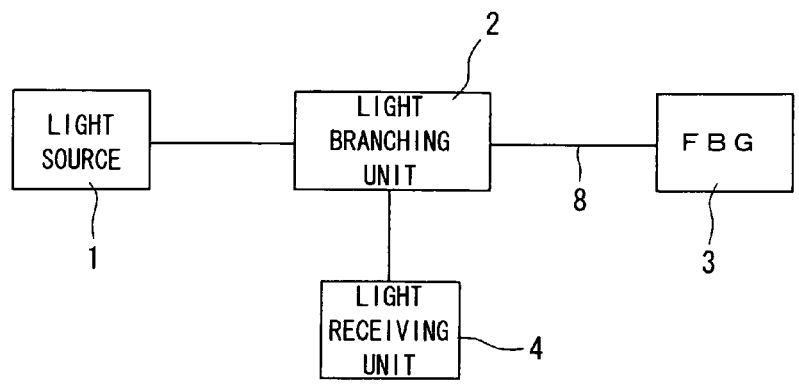
FIG. 1 is a block diagram showing a configuration of an FBG sensing device according to a first embodiment of the present invention.

FIG. 1 is a block diagram showing a configuration of an FBG sensing device of the first embodiment.

The FBG sensing device of the first embodiment is configured by a light source 1, a light receiving unit 4, a light branching unit 2, an FBG 3, and an optical fiber 8, and each component is connected with the optical fiber. The light branching unit 2 may be a 2-branch coupler or an optical circulator. The light source 1, the light receiving unit 4, and the light branching unit 2 may be configured as an optically connected integrated module. The length of the optical fiber 8 is not limited, and can be arbitrarily set according to the measuring distance, and may be within 1 m or greater than or equal to 10 km.

Figure 2:
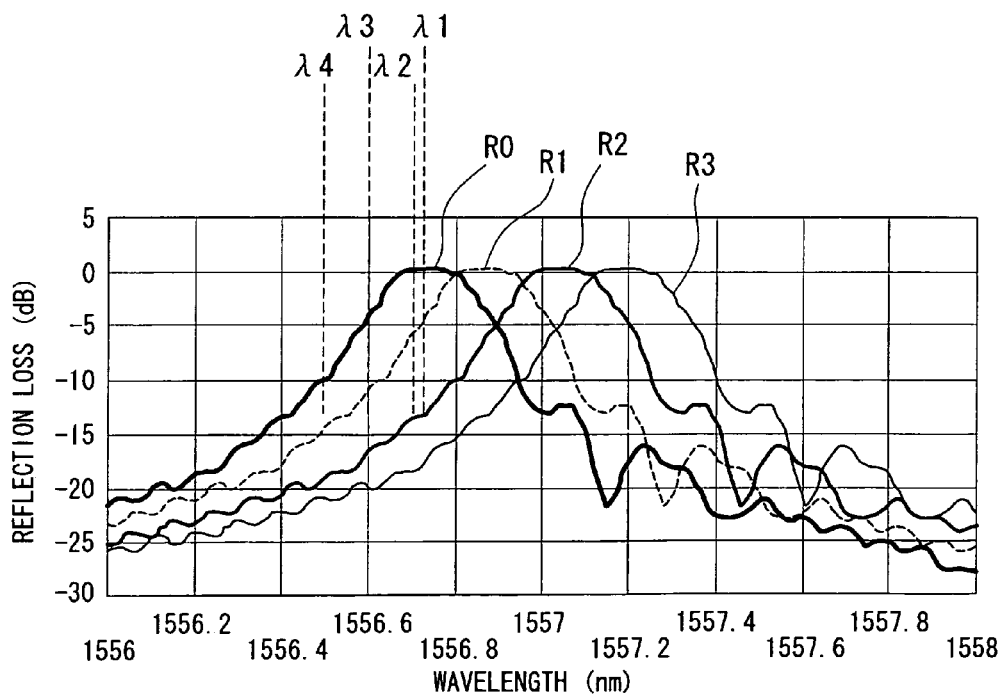
FIG. 2 is a view showing a reflectance spectrum of the FBG changed according to the amount of distortion.

FIG. 2 is a view showing the reflectance spectrum of the FBG 3 according to the amount of distortion, and the reflection wavelength band is, for example, defined as a range of about 0.8 nm width at where the reflectance of greater than or equal to −15 dB can be obtained. When defined as above, the reflection wavelength band contains an attenuating region in which the amount of reflectance attenuates in accordance with the distance away from the center wavelength on both sides of the center frequency. The amount of distortion is produced by extending the FBG 3. The shifted amount due to distortion of the reflected wavelength of the FBG 3 changes linearly with respect to the amount of distortion, and moves (shifts) towards the long wavelength side with the shape of the reflectance spectrum maintained substantially constant as the amount of distortion becomes larger. In the present embodiment, therefore, when the reflected wavelength range is moved in correspondence to the distortion, the slope of the attenuating region and the entire shape of the spectrum preferably do not change. In FIG. 2, the reflecting property shown denoted with a reference character R0 is the reflecting property of when the distortion is 0. In FBG, the wavelength displacement of 1.2 pm is generally known to be produced with respect to the distortion of 1με. Based on such relationship, when converting the amount of distortion from the wavelength shifted amount, the reflecting property shown denoted with a reference character R1 is the reflecting property of when the distortion is 100με, the reflecting property shown denoted with a reference character R2 is the reflecting property of when the distortion is 200με, and the reflecting property shown denoted with a reference character R2 is the reflecting property of when the distortion is 300με.

In the FBG sensing device of the first embodiment configured as above, the light output from the light source 1 is passed through the light branching unit 2 and the optical fiber 8 and to the FBG 3. In the FBG 3, the light of specific wavelength is reflected at a specific intensity defined by the reflecting property of the FBG. For instance, if the wavelength of the light source 1 is 1556.7 nm (wavelength shown by λ2 in FIG. 2), the reflectance loss is 0 dB when the amount of distortion of the FBG 3 is 0με, but when the distortion of 100με is applied to the FBG 3, the reflection wavelength band of the FBG 3 is moved (property shown with reference character R1 in FIG. 2), and the reflectance loss changes to −5 dB. The intensity of the reflecting light is changed in accordance with the amount of distortion. The reflected light is passed through the optical fiber 8, branched by the light branching unit 2, and reached to the light receiving unit 4, and then converted to an electrical signal having an intensity corresponding to the amount of reflected light in the light receiving unit 4. Thus, the displacement of the amount of reflected light can be detected based on the converted electrical signal, and the detection of the amount of distortion on the FBG 3 becomes possible.

Therefore, in the FBG sensing device of the first embodiment, the amount of distortion applied to the FBG 3 is measured by the displacement of the amount of reflected light, and thus has the following advantages.

That is, since the FBG sensing device of the first embodiment does not require the use of a complex wavelength detector for the light receiving unit, the configuration is simple, and the data obtained in the light receiving unit 4 are also simple. Therefore, according to the first embodiment, a fast and highly reliable measurement method is proposed.

In the FBG sensing device of the first embodiment, the light source 1 is desirably a light source in which the wavelength spectrum is a narrow band.

As shown in FIG. 2, the full width at half maximum (−3 dB) of the FBG 3 is about 0.2 nm. Further, as shown in FIG. 2, although the center wavelength moves in accordance with the amount of distortion, deformation in the reflectivity and the spectrum curve at the center wavelength is not found. Assuming the spectrum of the light source 1 is a linear spectrum having an extremely narrow wavelength band of 1556.6 nm, in FIG. 2, the reflectance loss at each amount of distortion is shown as the position of intersection between the dotted line of the wavelength of λ3 and the reflectance loss spectrum of each amount of distortion. On the other hand, if the spectrum of the light source 1 is wide and becomes wider than the reflection wavelength band, the reflectance loss according to the amount of distortion is easily expected to have a smaller amount of displacement from FIG. 2. Thus, in order to perform measurement of higher precision, the spectrum of the light source 1 is desirably sufficiently narrower than the reflection wavelength band of the FBG 3.

Thus, in the present invention, the narrow band light source that easily obtains high output is suitable, and can sufficiently compensate the transmission loss by the optical fiber 8, and thus is suitable for a long distance measurement. With regards to the reflection wavelength band of the FBG 3, the reflectance loss becomes smaller if a wider full width at maximum is used, and thus is more suitable for a long distance measurement.

The DFB laser used in the optical communication light source has a full width at maximum of the output wavelength of less than or equal to 1 pm or a sufficiently narrow band and thus is suitable for the present invention. The output of the DFB laser is high or greater than or equal to 5 dBm, and is higher by greater than or equal to 15 dB than the high output wide band light source (ASE light source).

Further, the light source 1 is desirably able to arbitrarily select the output wavelength. The reflected wavelength of the FBG 3 and the output wavelength of the light source are set so that the measurement sensitivity of the distortion becomes high, but generally, the manufacturing variance of the reflected wavelength of the FBG 3 is about 0.5 nm, and if the output wavelength of the light source 1 is fixed, the relationship between the reflected wavelength of the FBG 3 and the output wavelength of the light source sometimes deviate from the desired range.

The previously mentioned DFB laser may have the output wavelength adjusted by about 1 nm by controlling the temperature of the laser, and thus is desirable as the light source of the present invention in terms of such aspect.

The output wavelength of the light source 1 is desirably set to a short wavelength region than the reflected peak wavelength when no distortion is acted on the FBG 3.

In explaining with reference to FIG. 2, if, for example, the output wavelength of the light source 1 is in 1556.8 nm of the long wavelength region than the reflected peak wavelength of when distortion of the FBG 3 is not present, the reflectance losses of when there is no distortion (R0 of when 0με in FIG. 2) and when there is distortion (R1 of when 100με in FIG. 2) are substantially the same, and thus the amount of distortion cannot be measured. If the output wavelength of the light source 1 is in a short wavelength region than the reflected peak wavelength when distortion of the FBG 3 is not present, the reflectance loss with respect to the amount of distortion is uniquely determined, and a problem in which the measurement of the amount of distortion cannot be performed does not arise.

The amount of distortion of FIG. 2 is shown with a distortion due to expansion, but even with regards to the distortion due to contraction, the output wavelength of the light source 1 only needs to be in the short wavelength region than the reflected peak wavelength of when contracted to the maximum in the FBG 3.

Figure 3:
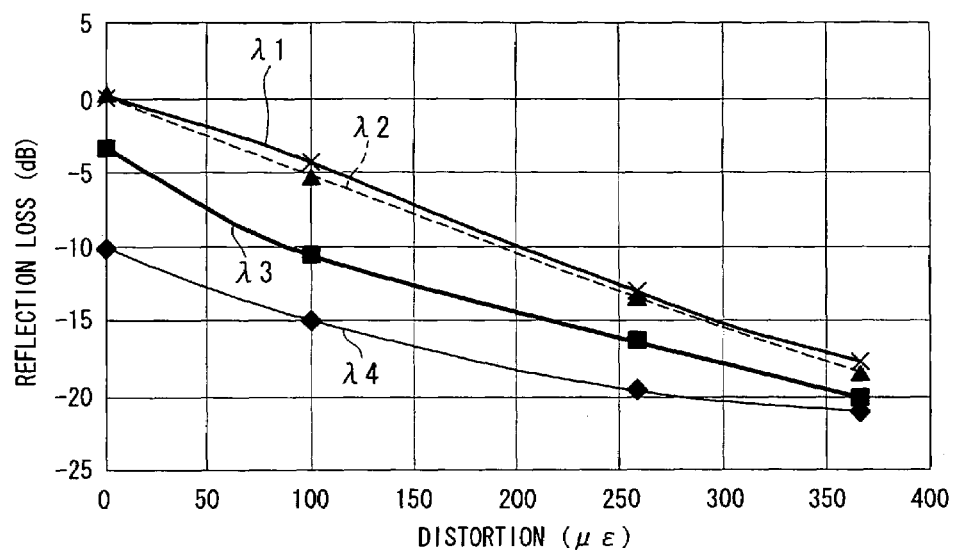
FIG. 3 is a view showing the reflectance loss with respect to the distortion at the FBG, showing a case of when the output wavelength of the light source is λ1, λ2, λ3, λ4.

FIG. 3 shows the reflectance loss with respect to the amount of distortion in the FBG 3, and shows the output wavelength of each of the four different light sources 1. In FIG. 3, λ1 to λ4 each corresponds to the wavelength shown as λ1 to λ4 of FIG. 2. λ1 is the reflected peak wavelength of the FBG 3 when there is no distortion, but at λ2 of the wavelength slightly shorter than such wavelength, the logarithmic corresponding value of the amount of distortion and the reflectance loss becomes approximately linear. Here, if the logarithmic amplifier (electric amplifier for logarithmic conversion) is used for the electric output of the light receiving unit 5, the amount of distortion is shown linearly with respect to the electric charge, and an extremely simple manufacturing device is configured. Thus, if the output wavelength of the light source 1 is adjusted so that the logarithmic corresponding value of the amount of reflected light from the FBG 3 is approximately linear with the amount of distortion, a more simple system can be proposed.

If the FBG 3 is designed so that the logarithmic corresponding value of the amount of reflected light of the FBG 3 not only at the specific wavelength such as λ2, but at an arbitrary wavelength is approximately linear with the amount of distortion, the configuration of the system is more simplified. That is, the wavelength of the reflectance spectrum of the FBG 3 and the reflectance loss (logarithmic corresponding value) need only to show a linear relationship in FIG. 2. Further, if designed so that the amount of reflected light of the FBG 3 at an arbitrary wavelength becomes approximately linear with the amount of distortion, that is, so that the wavelength of the reflectance spectrum of the FBG 3 and the absolute amount of the reflectance loss show a linear relationship, the configuration of the system is further simplified.

Second Embodiment

The second embodiment of the present invention will now be described.

Figure 5:
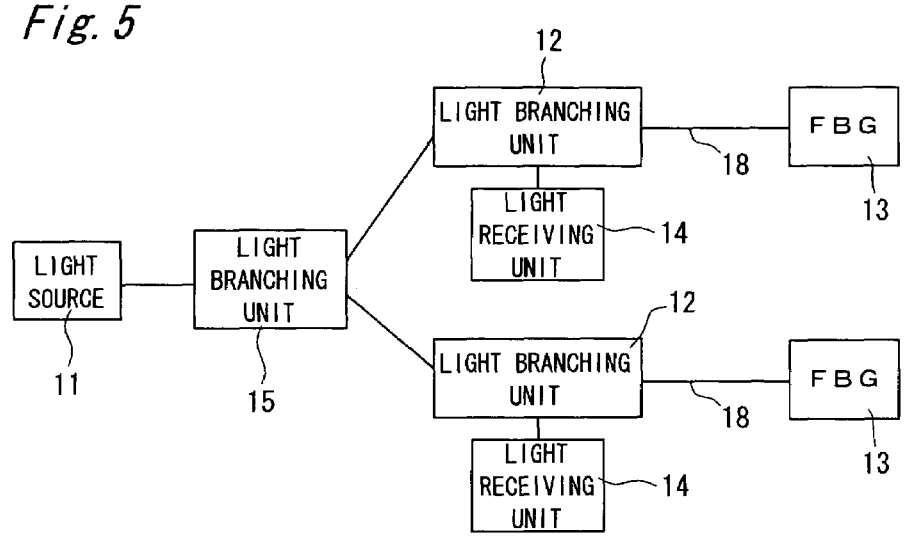
FIG. 5 is a block diagram showing a configuration of the FBG sensing device according to a second embodiment of the present invention.

FIG. 5 is a configuration view of the FBG sensing device showing the second embodiment of the present invention. It is configured by a light source 11, a light receiving unit 14, light branching units 12, 15 an FBG 13 and an optical fiber 18, and each component is connected with the optical fiber. The light branching unit 12 may be a 2-branch coupler or an optical circulator.

The light output from the light source 11 is branched by the light branching unit 15, and is respectively entered into the light branching unit 12. By passing the light branching unit, the intensity of light is reduced to about ½ (−3 dB). The intensity of light of when 4-branched is reduced to ¼ (−6 dB). As mentioned above, the DFB laser, which is the common narrow band light source, obtains an output higher than the wide band light source even if the intensity of light is reduced since the output is sufficiently large, and thus is suitable for the long distance measurement.

After branched at the light branching unit 15, the light is transmitted through the light branching unit 12 and the optical fiber 18 to the FBG 13, similar to the first embodiment. The light of specific wavelength is reflected at the FBG 13. The FBG 13 has the reflectance loss displaced in accordance with the amount of distortion, as explained with the first embodiment. The reflected light is transmitted through the optical fiber 18, and is entered into the light receiving unit 14 by the light branching unit 12. In the light receiving unit 14, the displacement of the amount of reflected light is linearly converted to an electric signal, and the amount of distortion acting on the FBG 13 is detected.

The output of the light source 11 is explained with an example of branching into two parts, but the present invention is not limited thereto, and may be configured so that the output of the light source 11 is branched into three or more parts.

Therefore, with the branching of the output of the light source 11, the amount distortion of a plurality of sites can be detected with a single light source.

Third Embodiment

The third embodiment of the present invention will now be described.

Figure 6:
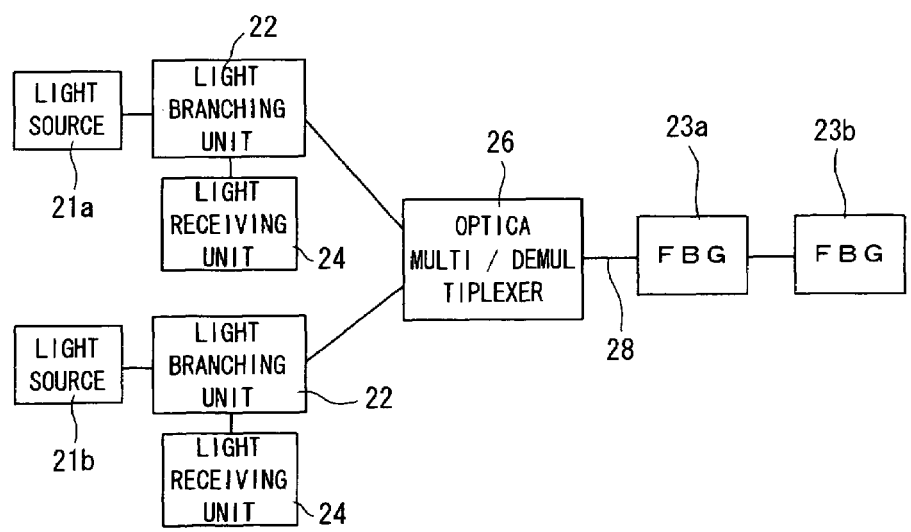
FIG. 6 is a block diagram showing a configuration of the FBG sensing device according to a third embodiment of the present invention.

FIG. 6 is a block diagram showing the configuration of the FBG sensing device showing the third embodiment of the present invention. The FBG sensing device showing the third embodiment is configured by light sources 21a, 21b, a light receiving unit 24, a light branching unit 22, FBGs 23a, 23b, a light wavelength optical multi/demultiplexer 26 and an optical fiber 28, and each component is connected with the optical fiber. The light branching unit 22 may be a 2-branch coupler or an optical circulator. Further, the light source 21, the light receiving unit 25, and the light branching unit 22 may be configured as an optically coupled integrated module.

In the FBG sensing device showing the third embodiment, the lights output from the light source 21a, 21b are each transmitted through the light branching unit 22, and entered into the light wavelength wave synthesizing/dividing 26, where they are wave synthesized. The light sources 21a, 21b output light of wavelength different from each other, and the output wavelengths of the light sources 21a, 21b are adjusted so as to be within the reflection wavelength band of the FBG 23a, 23b, respectively. The light wave synthesized in the light wavelength optical multi/demultiplexer 26 is transmitted through the optical fiber 28, to the FBG 23a, 23b and then reflected. The FBG 23a, 23b transmit the light of outside the reflection wavelength band and thus are not influenced by each other. As explained in the first embodiment, the FBG 23 has the reflectance loss displaced in accordance with the amount of distortion. The lights reflected at the FBG 23a, 23b are each transmitted through the optical fiber 28, and entered into the wavelength optical multi/demultiplexer 26, and wave divided in the wavelength optical multi/demultiplexer 26, and transmitted to the respective light receiving unit 24 by way of the light branching unit 22, and then converted to the electric signal.

In such a way, the amount of reflected light from the FBG 23a, 23b is detected based on the converted electric signal, and the amount of distortion at the FBG 23a, 23b is detected. A plurality of distortion amounts can be detected with one optical fiber 28 if the light wavelength optical multi/demultiplexer 26 is used.

Fourth Embodiment

The fourth embodiment of the present invention will now be described.

Figure 7:
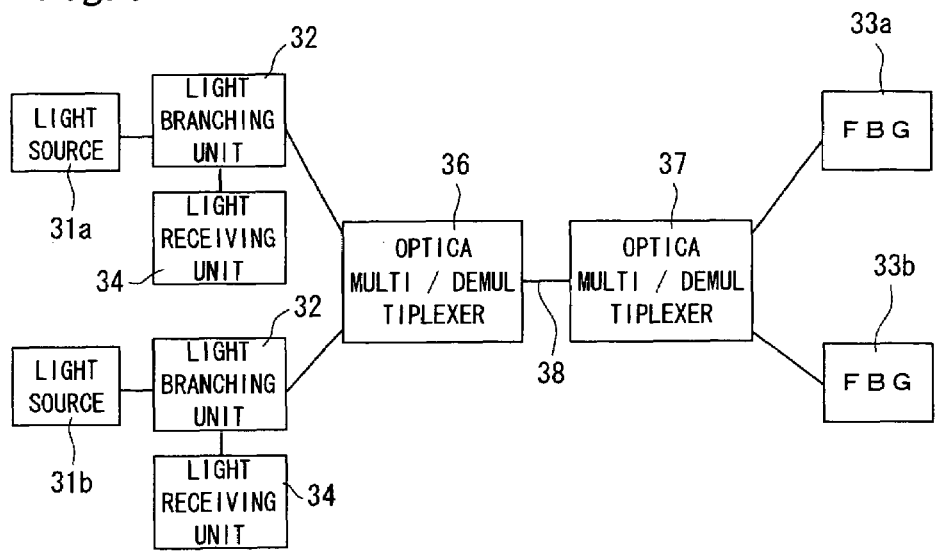
FIG. 7 is a block diagram showing a configuration of the FBG sensing device according to a fourth embodiment of the present invention.

FIG. 7 is a block diagram showing a configuration of the FBG sensing device showing the fourth embodiment of the present invention. It is configured by light sources 31a, 31b, two light receiving units 34, two light branching units 32, FBGs 33a, 33b and light wavelength optical multi/demultiplexers 36, 37, and each component is connected with the optical fiber. The light branching unit 32 may be a 2-branch coupler or an optical circulator.

The lights output from the light source 31a, 31b are each transmitted through the light branching unit 32, entered into the light wavelength optical multi/demultiplexer 36, and wave synthesized in the light wavelength optical multi/demultiplexer 36. Each light source 31a, 31b outputs a light of different wavelength, and is adjusted so as to be within the reflection wavelength band of each FBG 33a, 33b respectively. The wave synthesized light is transmitted through the optical fiber 38, and wave divided at the light wavelength optical multi/demultiplexer 37, to the respective FBG 33a, 33b and then reflected. Similar to the first embodiment, each FBG 33a, 33b has the reflectance loss displaced in accordance with the amount of distortion. The reflected light is wave synthesized at the light wavelength optical multi/demultiplexer 37, and transmitted through the optical fiber 38, and wave divided at the wavelength optical multi/demultiplexer 36, and transmitted through the respective light branching unit 32 to the respective light receiving unit 34, and converted to the electric signal. Similar to the first embodiment, the amount of distortion at the FBG 33a, 33b is detected from the amount of received light converted to the electric signal. A plurality of amount of distortions is detected with one optical fiber 38 if the light wavelength optical multi/demultiplexer 36, 37 is used. Further, a system of higher reliability is proposed since the FBG 33b (or FBG 33a) is not subjected to the influence of fault even if fault such as disconnection of optical fiber and the like occurs between the FBG 33a (or FBG 33b) and the light wavelength optical multi/demultiplexer 37.

Fifth Embodiment

The fifth embodiment of the present invention will now be described.

The fifth embodiment of the present invention has one FBG 23a arranged at a position not influenced by distortion in the FBG sensing device of a configuration shown in FIG.

6, and temperature controlled with Peltier element or a heater so as not to be influenced by temperature. The temperature control by the above require supply of power with electric control, but as a method of not requiring supply of power, a method of canceling the temperature characteristic by mounting to an Invar and the like in which the linear thermal expansion has a negative property and providing contraction to the FBG may be used.

In the FBG sensing device of the fifth embodiment configured as above, the lights output from the light sources 21a, 21b are transmitted through the light branching unit 21, and entered into the light wavelength optical multi/demultiplexer 26 and wave synthesized therein. Each light source 21a, 21b is configured to output the light of different wavelength, and the output wavelength of one light source 21a is adjusted so as to be in the reflection wavelength band of the FBG 23a, and the output wavelength of the other light source 21b is adjusted so as to be in the wavelength in the reflection wavelength band of the FBG 23b. The light wave synthesized at the light wavelength optical multi/demultiplexer 26 is transmitted through the optical fiber 28 to the FBG 23a, 23b and then reflected. Each FBG 23 transmits the light other than the reflection wavelength band, and thus is not influenced by each other. As explained in the first embodiment, the FBG 23b has the reflectance loss displaced in accordance with the amount of distortion, but since the FBG 23a is arranged so as not be subjected to distortion, the reflectance loss does not change. The reflected light is transmitted through the optical fiber 28, and wave divided at the wavelength optical multi/demultiplexer 26, branched at the light branching unit 22, and transmitted to the light receiving unit 24, respectively, and then converted to an electric signal. Thus, the amount of distortion at the FBG 23a, 23b is detected based on the electric signal corresponding to the amount of reflected light.

A case of when a physical load is applied to the optical fiber 28 thereby causing change in the transmission loss of the optical fiber 28 will now be considered.

In this case, the amount of reflected light entering the light receiving unit 24 from the FBG 23b is changed, and the amount of distortion of the FBG 23b cannot be accurately detected. However, since the changes in the amount of reflected light by the transmission losses of the optical fiber 28 of the FBG 23a and the FBG 23b are the same, compensation becomes possible by removing the amount of change in the amount of reflected light of the FBG 23a from the change in the amount of reflected light at the FBG 23b, and thus the amount of distortion on the FBG 23b is accurately detected.

Therefore, by arranging the FBG 23a that is not influenced by the amount of distortion (and temperature), the amount of distortion can be accurately detected irrespective of the load applied to the optical fiber 18.

Further, in the FBG sensing device of the fourth embodiment shown in FIG. 7, a similar effect is obtained by arranging the FBG 33a so as not to be influenced by distortion and temperature.

Sixth Embodiment

The sixth embodiment of the present invention will now be described.

Figure 8:
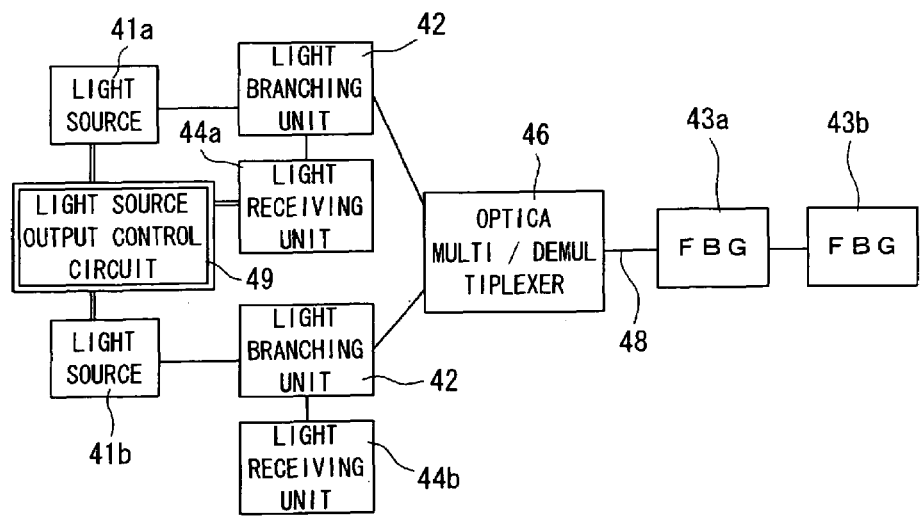
FIG. 8 is a block diagram showing a configuration of the FBG sensing device according to a sixth embodiment of the present invention.
Figure 9:
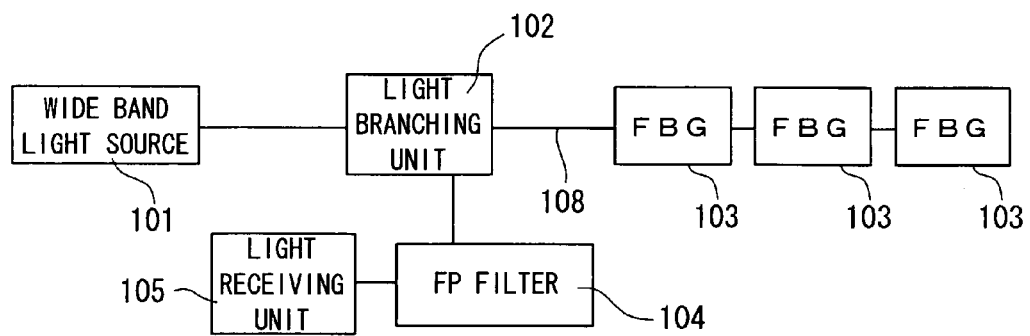
FIG. 9 is a block diagram showing one example of the configuration of a conventional FBG sensing device.

FIG. 8 is a block diagram showing a configuration of the FBG sensing device of the sixth embodiment, which FBG sensing device is, in the FBG sensing device of FIG. 6, configured in the same way as the fourth embodiment other than the fact that a light source output control circuit 49 for controlling the output of the light sources to have the amount of receiving light of the light receiving unit 44a always constant is connected to the light sources 41a, 41b.

Further, in the FBG sensing device of the configuration shown in FIG. 8, the FBG 43a is arranged at a position that is not influenced by distortion and is controlled so as not to be influenced by temperature, similar to the fifth embodiment.

In the FBG sensing device of the sixth embodiment, the lights output from the light sources 41a, 41b are transmitted through the light branching unit 42 and entered into the light wavelength optical multi/demultiplexer 46 and wave synthesized therein. Each light source 41a, 41b is configured to output a light of wavelength different from each other, and the output wavelength of the light source 41a is adjusted so as to be in the reflection wavelength band of the FBG 43a, and the output wavelength of the light source 41b is adjusted so as to be in the reflection wavelength band of the FBG 43b. The light wave synthesized in the light wavelength optical multi/demultiplexer 46 is transmitted through the optical fiber 48 to the FBG 43a, 43b and then reflected. Each FBG 43 transmits the light other than the reflection wavelength band, and thus the light of reflection wavelength band of the FBG 43b is transmitted without being influenced by the FBG 43a. As explained in the first embodiment, the FBG 43b has the reflectance loss displaced according to the amount of distortion, but the FBG 43a is arranged so as not to be subjected to distortion and thus the reflectance loss does not change. The light reflected at the FBG 43a, 43b is respectively transmitted through the optical fiber 48, and entered into the light wavelength optical multi/demultiplexer 46 and then wave divided therein. The light wave divided at the light wavelength optical multi/demultiplexer 46 is transmitted through the light branching unit 42 to the light receiving unit 44 and converted to an electrical signal. Thus, in the sixth embodiment, the amount of distortion at the FBG 43a, 43b is detected based on the electric signal converted so as to correspond to the amount of reflected light.

Generally, when a physical load is applied to the optical fiber causing change in transmission loss of the optical fiber and the amount of reflected light entering the light receiving unit from the respective FBG is changed, the amount of distortion of the FBG cannot be accurately detected.

However, in the sixth embodiment, by controlling the output of the light source 41a so as to have the amount of reflected light from the FBG 43a received at the light receiving unit 44a always constant and by controlling the output of the light source 41b at the light source output control circuit 49, the amount of reflected light from the FBG 43a always becomes constant, and since the light source 41b is simultaneously controlled, the amount of distortion of the FBG 43b can be accurately detected. If the light sources 41a, 41b are DFB lasers, the light source output has a substantially proportional relationship with the laser current, and thus the variation amount (percentage) of the laser current produced at the light source 41a is provided to the light source 42b.

When the FBG 43a is arranged so as not to be influenced by the amount of distortion (and temperature), and the light sources 41a, 41b are controlled so that the amount of reflected light from the FBG 43a is constant, the amount of distortion is accurately detected irrespective of the load applied to the optical fiber 18.

Further, FIG. 8 is a view added with the control function of the light source to FIG. 6, but in a configuration of adding the control function of the light source to FIG. 7 as well, the amount of distortion is accurately detected irrespective of the load applied to the optical fiber 18.

The DFB laser is given as an example of a light source in the above embodiments, but if a laser of low coherency of a ring laser and the like using EDF is used, a stable output is obtained due to the influence of temperature variation and the like of the optical fiber.

Seventh Embodiment

The FBG sensing device of the seventh embodiment according to the present invention will now be explained.

The FBG sensing device of the seventh embodiment is different from the previously explained embodiments in that a wide band light source is used, and in that two or more FBGs are used and the measurement of distortion is made based on the band width of the synthetic spectrum. In the FBG sensing device of the seventh embodiment configured as above, the distortion in which the influence of the temperature change is excluded is obtained by simply measuring the band width of the synthetic spectrum.

Figure 11:
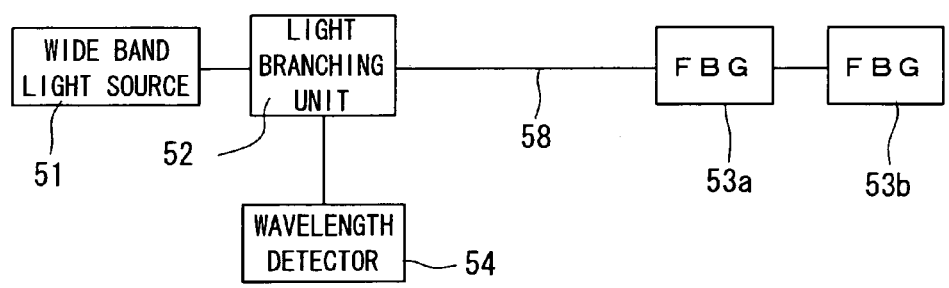
FIG. 11 is a block diagram showing a configuration of the FBG sensing device according to a seventh embodiment of the present invention.
Figure 10A:
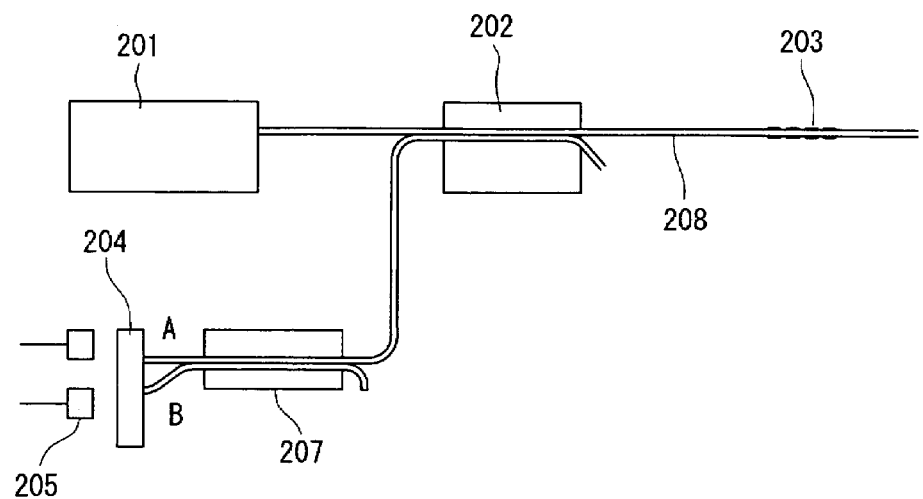
FIG. 10A is a block diagram showing another example of the configuration of a conventional FBG sensing device.
Figure 10B:
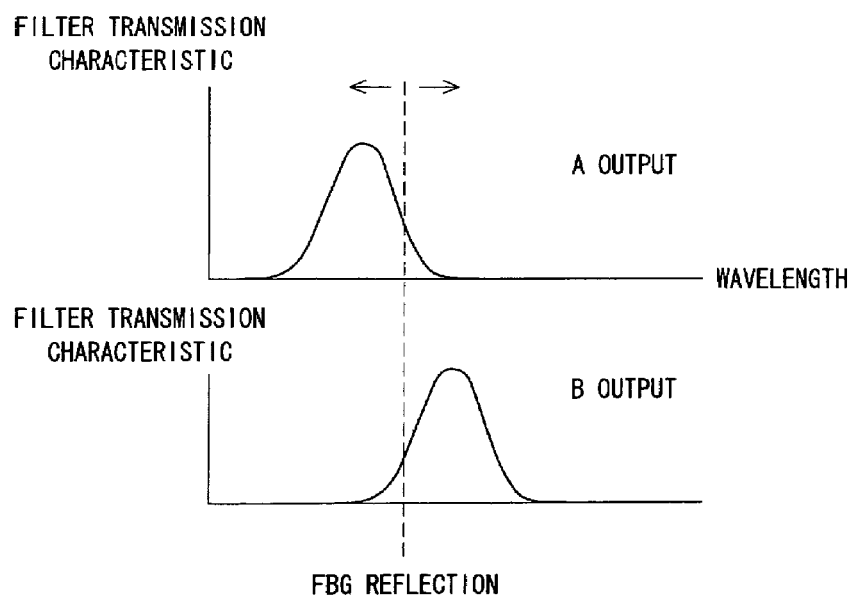
FIG. 10B is a view showing a transmission property of a filter in the conventional FBG sensing device shown in FIG. 10A.

FIG. 11 is a view showing a configuration of the FBG sensing device of the seventh embodiment.

The FBG sensing device of the seventh embodiment is configured by a wide band light source 51, a wavelength detector 54, a light branching unit 52, FBGs 53a, 53b and an optical fiber 58, and each component is connected with the optical fiber.

It is to be noted that the FBG sensing device of the seventh embodiment, in particular, has one of a fiber-Bragg grating 53b of the two fiber-Bragg gratings 53a, 53b arranged so as to simultaneously receive both temperature change and distortion and the other fiber-Bragg grating 53a arranged so as to receive only the temperature change, and the amount of distortion produced at the fiber-Bragg grating 53b is detected based on the band width of the synthetic spectrum in which the respective reflected waves are synthesized.

In the FBG sensing device of the seventh embodiment configured as above, the fiber-Bragg grating 53a and the fiber-Bragg grating 53b preferably have reflectance spectrum of substantially the same wavelength band, and the reflectance spectrum desirably share a greater portion. The light branching unit 52 may be a 2-branch coupler or an optical circulator.

The fiber-Bragg grating 53b is pulled at both ends to cause distortion and is fixed to a solid object having a linear thermal expansion coefficient same as the fiber-Bragg grating 53b. The linear thermal expansion of the fiber-Bragg grating 53b is so small as to be less than or equal to $10^{-6}$, and similarly, an Invar and the like having a small linear thermal expansion is preferable. The measurement of the amount of distortion is not directly performed, and the amount of distortion is converted from the amount of wavelength shift. Generally, the amount of distortion of the fiber-Bragg grating 53b is known to change linearly with respect to the shifted amount of the reflected wavelength of the fiber-Bragg grating 53b, causing wavelength displacement of 0.0012 nm with respect to the distortion of $1\mu\epsilon$, and the amount of distortion is measured using such relationship. Both ends of the fiber-Bragg grating 53b are not fixed.

In the FBG sensing device of the seventh embodiment configured as above, the light output from the wide band light source 51 is transmitted through the light branching unit 52 and the optical fiber 58 to the fiber-Bragg grating 53a. The light of specific wavelength is reflected at the fiber-Bragg grating 53a. The light of wavelength other than the specific wavelength is transmitted through the fiber-Bragg grating 53a to the fiber-Bragg grating 53b, where in the fiber-Bragg grating 53b, the light of different specific wavelength changed by distortion is reflected. The light reflected at the fiber-Bragg grating 53b is transmitted through the fiber-Bragg grating 53a, synthesized with the light reflected by the fiber-Bragg grating 53a, and transmitted through the optical fiber 58 to the wavelength detector 54 by way of the light branching unit 52. The wavelength detector 54 detects the synthesized light of the fiber-Bragg grating 53a and the fiber-Bragg grating 53b.

Figure 12:
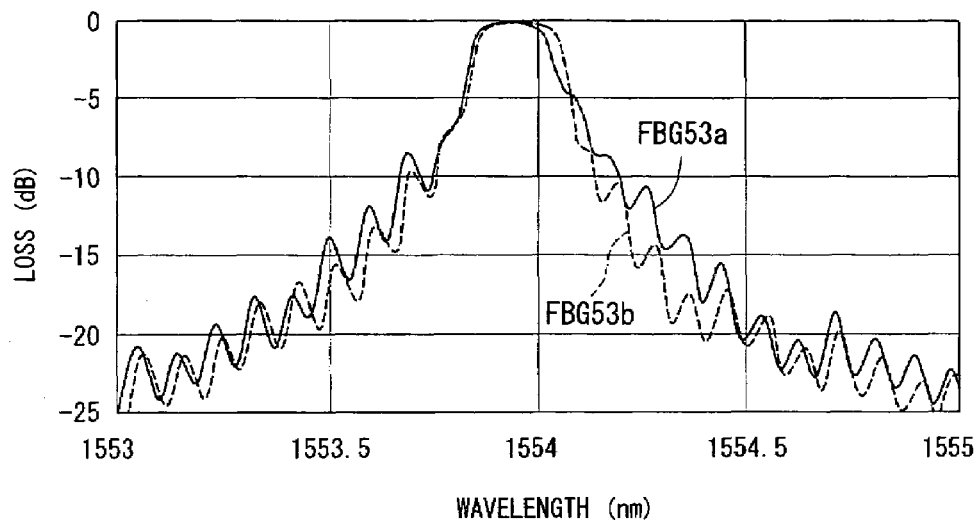
FIG. 12 is a view showing a reflectance spectrum at 25° C. of two fiber-Bragg gratings in the FBG sensing device of the seventh embodiment.

FIG. 12 is a view showing the reflected spectrum (state without distortion) of the fiber-Bragg grating 53a, 53b at 25° C.

According to FIG. 12, both fiber-Bragg gratings 53a, 53b have a center wavelength near 1553.9 nm, the full width at half maximum has reflection wavelength band of about 0.2 nm, and share substantially the entire band. It is apparent that the more the shared region, the higher the wavelength usage efficiency.

Figure 13:
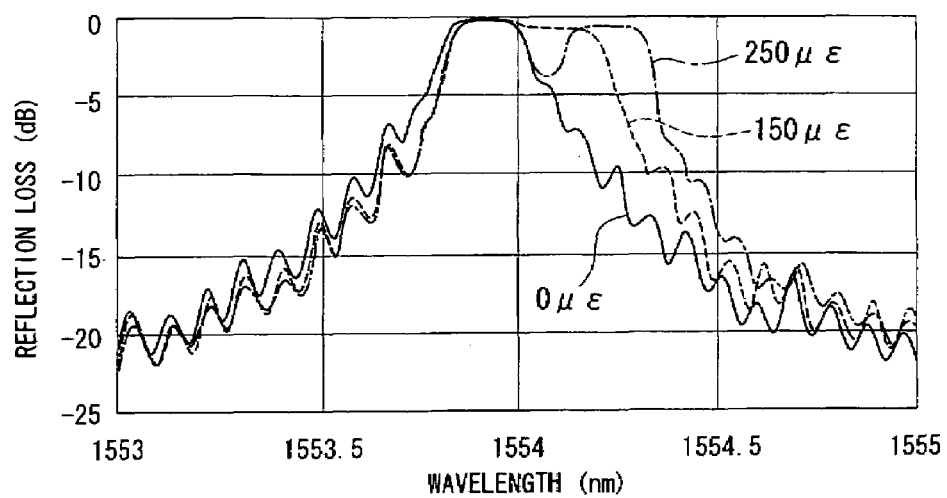
FIG. 13 is a view showing the reflectance spectrum in which the reflected waves from the two fiber-Bragg gratings are synthesized in the FBG sensing device according to the seventh embodiment, as to the respective amount of distortion varied in the amount of distortion on the fiber-Bragg grating.

FIG. 13 shows the reflectance spectrum in which the reflected wave from the fiber-Bragg grating 53a and the reflected wave of the fiber-Bragg grating 53b are wave synthesized in the configuration of the seventh embodiment, and also shows the wave synthesized reflectance spectrum of when the amount of distortion on the fiber-Bragg grating 53b is changed. In the configuration of the seventh embodiment, detection of the peak wavelength of each fiber-Bragg grating 53a, 53b from the wave synthesized reflectance spectrum is apparently difficult (FIG. 13).

However, the fiber-Bragg gating 53a is not subjected to the influence of distortion, and only the reflected light of the fiber-Bragg grating 53b applied with distortion is wavelength shifted by distortion, and thus the spread of the reflection wavelength band is considered to be related to the amount of distortion.

Figure 14:
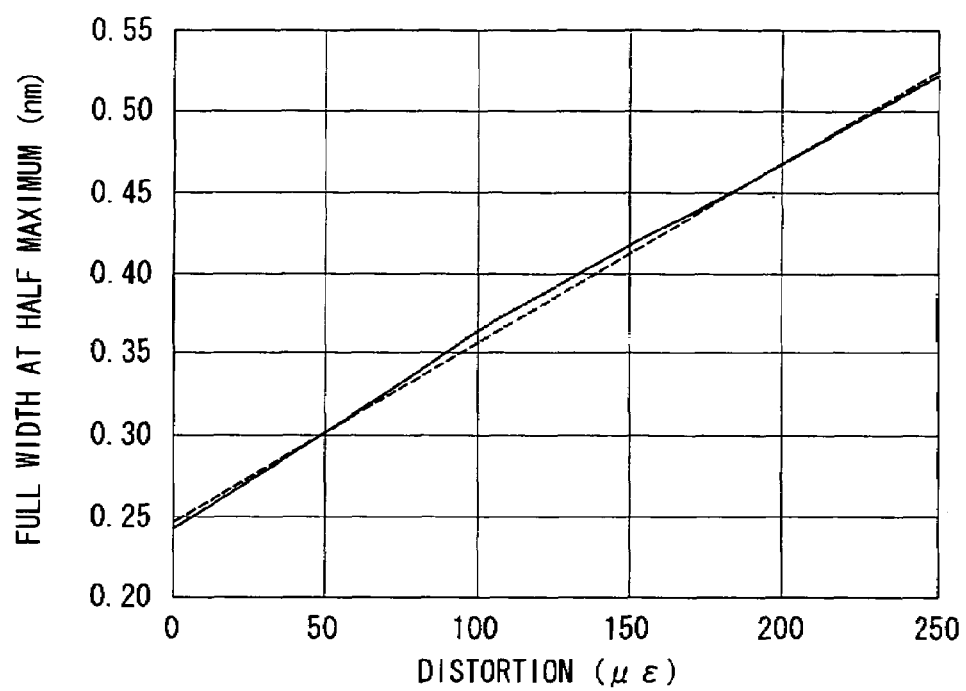
FIG. 14 is a view showing a relationship between the amount of distortion and the reflection wavelength band (full width at half maximum) in the FBG sensing device of the seventh embodiment.

FIG. 14 is a view showing the relationship between the amount of distortion and the wavelength band (full width at half maximum) of the reflectance spectrum. In FIG. 14, the solid line is the actual measurement value, and is approximated with a line shown with a dotted line. The full width at half maximum of the wave synthesized reflectance spectrum of the fiber-Bragg gratings 53a, 53b has a relationship substantially proportional to the amount of distortion.

Figure 15:
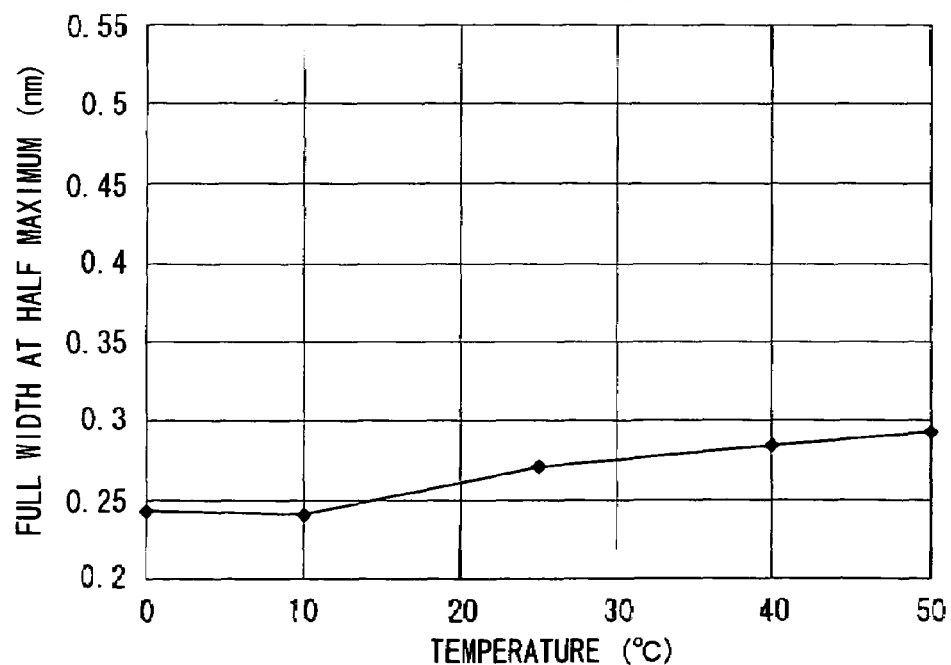
FIG. 15 is a view showing a relationship between the temperature and the full width at half maximum in the FBG sensing device of the seventh embodiment.
Figure 16:
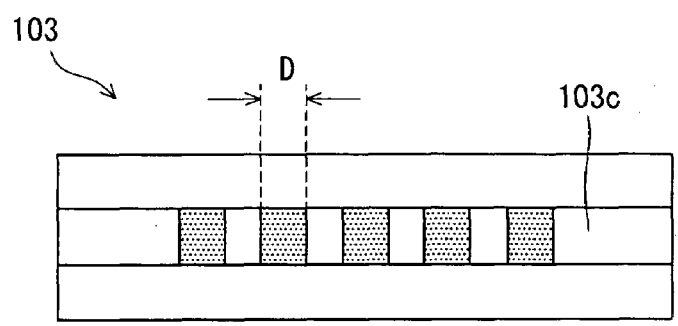
FIG. 16 is a view schematically showing the fiber-Brag grating.
Figure 17:
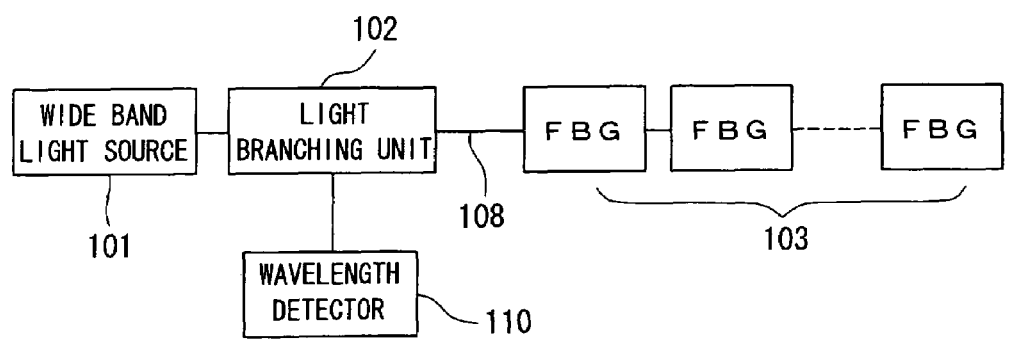
FIG. 17 is a block diagram showing the configuration of the conventional FBG sensing device.

FIG. 15 is a view showing the relationship between the temperature and the full width at half maximum of the synthetic reflected spectrum of when the amount of distortion applied to the fiber-Bragg grating 53b is made constant.

As shown in FIG. 15, the full width at half maximum is recognized to change 0.05 nm due to temperature change from 0° C. to 50° C., but this is the variation amount of when the temperature characteristic (about 0.01 nm/° C.) of a single fiber-Bragg grating changes about 5° C. and corresponds to about 1/10. From FIG. 14, the variation amount 0.05 nm is about $\pm 20\mu\epsilon$ when converted to the amount of distortion, and is a value of about the error in the distortion measurement of a few hundred $\mu\epsilon$, and is recognized to be the temperature compensated in the present embodiment.

Thus, by using one of the fiber-Bragg grating 53a or the fiber-Bragg grating 53b having substantially the same reflection wavelength band for distortion measurement, and the other for temperature compensation, and measuring the band width of the wave synthesized reflectance spectrum, the amount of distortion can be measured without being subjected to influence of the temperature change. Thus, according to the configuration of the seventh embodiment, the distortion temperature compensated in the reflection wavelength band of one fiber-Bragg grating can be measured, and thus the wavelength usage efficiency is doubled compared to the conventional measuring method using two different reflection wavelength bands.

In the above embodiments, an example in which the fiber-Bragg-gratings 53a, 53b used have large reflectance spectrum ripples is used as shown in FIG. 12, but such ripples are considered to originate from the temperature characteristic. If the fiber-Bragg grating in which the ripples are improved through a technique known as apodization is used, the variation amount of the temperature is expected to be smaller.

EXAMPLE 1

The FBG sensing device showing the first embodiment of the present invention was formed.

The light source 1 used was the DFB laser generally used in optical communication. The maximum output was about 3 mW and the output wavelength was near 1556 nm. The full width at half maximum of the wavelength spectrum was 1 pm. It further had temperature control function and by setting the control temperature to between 15° C. and 35° C., the peak of the output wavelength was operated by about 1 nm. In the present embodiment, it was adjusted to 1556.70 nm.

The light receiving unit 4 used was a pin photodiode generally used in optical communication. The light receiving sensitivity was −50 dBm, and the wavelength band had a planar property between 1000 nm and 1600 nm. Further, the relationship between the amount of received light and the current was linear between −50 dBm and 0 dBm.

The circulator in which the transmission loss is about 0.5 dB, and the wavelength property of the transmission loss is below 0.1 dB was used for the light branching unit 2.

For the FBG 3, that in which the reflectivity is greater than or equal to 95%, the full width at half maximum of the reflectance spectrum is less than or equal to 0.25 nm, and the reflected peak wavelength is 1556.72 nm was used.

Figure 4:
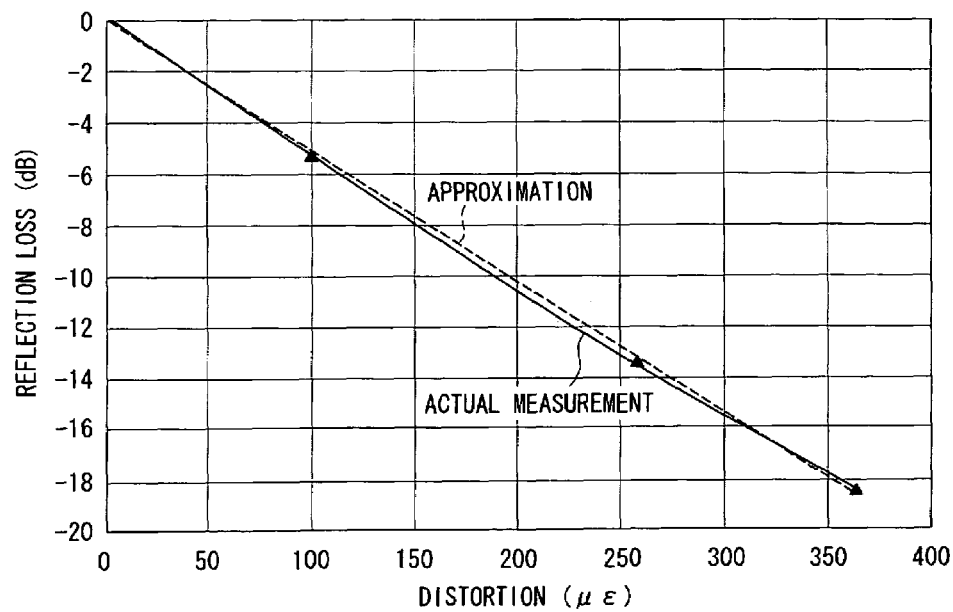
FIG. 4 is a view showing a relationship between the distortion of the FBG and the reflectance loss at the FBG sensing device of embodiment 1 of the present invention.

The result of the present example is shown in FIG. 4.

The result substantially the same as the result for wavelength λ2 shown in FIG. 2 was obtained. The error with the approximated curve is recognized to substantially match at less than or equal to 10με in amount of distortion.

Similarly, the FBG sensing devices for the third, the fourth, the fifth and the sixth embodiments were formed, and results similar to the experiment based on the first embodiment were obtained.

As for the FBG 23a or the FBG 33a, the same as an FBG 3 was used, and the FGB having the reflected peak wavelength of 1533.52 nm was used for the FBG 23b or the FBG 33b. The optical multi/demultiplexer for synthesizing/dividing the wave to greater than or equal to 1545 nm and less than or equal to 1545 nm was used for the light wavelength optical multi/demultiplexer 26, 36. The transmission property at the respective wavelength region was less than or equal to 0.1 dB at wavelength dependence of 20 nm.

EXAMPLE 2

The FBG sensing device of the seventh embodiment according to the present invention was formed.

The ASE light source that outputs light of greater than or equal to −10 dBm/nm at band of 1530 nm to 1560 nm was used for the wide band light source 51. The light spectrum analyzer generally used in optical communication was used for the wavelength detector 54. The circulator in which the transmission loss is about 0.5 dB and the wavelength property of the transmission loss is less than 0.1 dB was used for the light branching unit 52. For the fiber-Bragg grating 53a, 53b, that in which the reflectivity is greater than or equal to 95%, the full width at half maximum of the reflectance spectrum is less than or equal to 0.25 nm, and the reflected peak wavelength at 25° C. is 1553.9 nm was used. The transmission loss at the wavelength other than the reflected wavelength was about 0.1 dB.

Distortion of 200με was applied to the fiber-Bragg grating 53b, both fiber-Bragg-gratings 53a, 53b were placed in a constant-temperature tank, and the full width at half maximum of the wave synthesized reflected light of the fiber-Bragg gratings 53a, 53b was recognized. As a result, temperature property substantially similar to FIG. 15 was recognized. The error of the amount of distortion was about ±10% with 25° C. as the reference. Similarly, different amount of distortion was applied to the fiber-Bragg grating 53b and similar result was recognized.

INDUSTRIAL APPLICABILITY

According to the present invention, the FBG sensing device that is suitable for high-speed measurement such as vibration measurement, that is able to perform sufficiently distant remote measurement, that is inexpensive, and that in which data processing is simple is provided.

The invention claimed is:

1. A FBG distortion sensing device comprising;
a pair of fiber-Bragg gratings in which the reflection wavelength band of the incident light is changed by being subjected to temperature change or distortion, and
a light source,
wherein reflection wavelength bands of the pair of fiber-Bragg gratings at a state without distortion are substantially equal,
wherein one of the pair of the fiber-Bragg gratings is arranged so as to be simultaneously subjected to the temperature change and distortion, and the other one is arranged so as to be subjected to only the temperature change, and the amount of distortion produced at one of the fiber-Bragg grating is detected based on a change of the band width of a synthetic reflectance spectrum in which the reflected waves from the pair of fiber-Bragg gratings are synthesized.

* * * * *